US011279854B2

United States Patent
Dietze et al.

(10) Patent No.: US 11,279,854 B2
(45) Date of Patent: Mar. 22, 2022

(54) PRIMER SOLUTION FOR IMPROVING THE ADHESION OF ADHESIVE STRIPS ON HYDROPHILIC SURFACES IN MOIST AND WET CONDITIONS

(71) Applicant: TESA SE, Norderstedt (DE)

(72) Inventors: Sebastian Dietze, Hamburg (DE); Uwe Schümann, Pinneberg (DE); Tanja Altenwegner, Hamburg (DE); Eugenia Seibel, Seevetal (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/753,467

(22) PCT Filed: Aug. 18, 2016

(86) PCT No.: PCT/EP2016/069559
§ 371 (c)(1),
(2) Date: Feb. 19, 2018

(87) PCT Pub. No.: WO2017/029345
PCT Pub. Date: Feb. 23, 2017

(65) Prior Publication Data
US 2018/0244958 A1 Aug. 30, 2018

(30) Foreign Application Priority Data
Aug. 20, 2015 (DE) .................... 10 2015 215 879.9

(51) Int. Cl.
C09J 5/00 (2006.01)
C09J 5/02 (2006.01)
C03C 17/30 (2006.01)
(52) U.S. Cl.
CPC ............... *C09J 5/02* (2013.01); *C03C 17/30* (2013.01); *C03C 2217/76* (2013.01); *C09J 2483/003* (2013.01)
(58) Field of Classification Search
None
See application file for complete search history.

(56) References Cited

U.S. PATENT DOCUMENTS

| 6,461,670 | B2 * | 10/2002 | Akamatsu | ............... | C03C 17/30 427/165 |
| 7,427,442 | B2 * | 9/2008 | Albert | ..................... | C23C 28/00 428/447 |
| 8,932,396 | B2 | 1/2015 | Krawinkel | | |
| 2005/0081993 | A1 * | 4/2005 | Ilkka | .......................... | C09J 5/00 156/309.3 |
| 2006/0251908 | A1 | 11/2006 | Fukasawa et al. | | |
| 2010/0065447 | A1 | 3/2010 | Krawinkel et al. | | |
| 2011/0315048 | A1 * | 12/2011 | Krawinkel | ................. | C09J 5/02 106/2 |

FOREIGN PATENT DOCUMENTS

| DE | 102007030196 A1 | 5/2008 |
| DE | 102009007930 A1 | 8/2010 |
| EP | 1659160 A1 | 5/2006 |
| WO | 2005040296 A1 | 5/2005 |

OTHER PUBLICATIONS

International Search Report for corresponding application PCT/EP2016/069559 dated Nov. 7, 2016.
Written Opinion of the International Searching Authority for corresponding application PCT/EP2016/069559 dated Nov. 7, 2016 (English translation not available).
Polar Solvent (https://en.wikipedia.org/wiki/Polar_solvent (2020)).

* cited by examiner

*Primary Examiner* — Stefanie J Cohen
(74) *Attorney, Agent, or Firm* — Norris McLaughlin PA

(57) ABSTRACT

The invention relates to a solution in particular for the pre-treatment of a surface, containing, preferably consisting of: I) at least one first silane of formula (I) with $R^1$, $R^2$, $R^3$ independently selected from the groups methyl, ethyl, 2 methoxyethyl, propyl, i-propyl, butyl, benzyl, wherein m=0 or 1, n=3 to 12, p=1 or 2, and for p=1, Y=a functional group selected from the groups (meth)acryl, (meth)acryloxy, mercapto, ureido, —NH—$CH_2$—$CH_2$—$NR^4R^5$, —$NR^4R^5$ (with $R^4$ and $R^5$ independently selected from the groups H, alkyl, phenyl, benzyl, cycloalkyl), or for p=2, Y=NH; II) at least one second silane of formula (II) with $R^1$, $R^2$, $R^3$ independently selected from the groups methyl, ethyl, 2 methoxyethyl, propyl, i-propyl, butyl, benzyl, wherein m=0 or 1, $R^8$=H, alkyl, phenyl, benzyl or cycloalkyl; III) at least one alcohol; and IV) water.

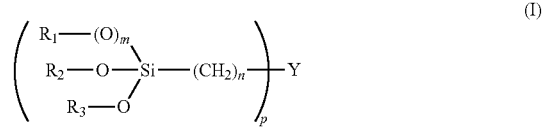

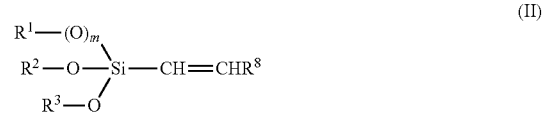

15 Claims, No Drawings

PRIMER SOLUTION FOR IMPROVING THE ADHESION OF ADHESIVE STRIPS ON HYDROPHILIC SURFACES IN MOIST AND WET CONDITIONS

This application is a § 371 U.S. National stage of PCT International Patent Application No. PCT/EP2016/069559, filed Aug. 18, 2016, which claims foreign priority benefit of German Application No. DE 10 2015 215 879.9, filed Aug. 20, 2015, the disclosures of each of which patent applications are incorporated herein by reference.

The invention relates to a solution and to use thereof for pretreating a hydrophilic substrate such as glass, in order to improve the adhesion of a bonding agent to this substrate under moist and wet conditions.

The adhesive bonding of lightweight articles in the household is frequently performed using adhesive tapes, hotmelt adhesives or reactive adhesives. Since the holding power is increased on solid substrates relative to cleavable substrates, bonding takes place, if possible, to metal, ceramic tiles, or glass. Besides their use in the household, bonding agents are also used for bonding glass, metal, etc. in industrial production.

A feature common to ceramic and glass surfaces is that they can be classed as being hydrophilic. One property of hydrophilic substrates is the capacity often to have, bound on the surface, a very thin layer of adsorbed water, which can be removed only at very high temperatures. This layer has the capacity, particularly under high atmospheric humidity or on exposure to water, to accommodate further water and so to impair the bonding performance, up to the point of complete failure of the bond. The reaction of adhesives may be inhibited by moisture if these adhesives are required to form a covalent bond with the surface in order to fulfill their function. Pressure-sensitive adhesives (PSAs) are based frequently on acrylates, natural rubber, or styrene block copolymers. PSAs for double-sided adhesive tapes in particular generally consist of acrylates or styrene block copolymers, with the holding power being often somewhat lower in the case of the acrylates. Under humid conditions especially, these adhesives exhibit precisely the opposite behavior: acrylate PSAs are significantly less susceptible to wetness and humidity than are block copolymer compositions.

The construction of the adhesive tapes also contributes to their sensitivity to moisture: hard adhesives and adhesive tapes with rigid carriers are frequently more susceptible than those having highly flexible carriers. Double-sided adhesive tapes with intermediate foam carriers, in particular, react sensitively to moisture when they are bonded to hydrophilic substrates.

Hotmelt adhesives frequently consist of styrene block copolymers or of ethylene-vinyl acetate. Both types of hotmelt adhesive are susceptible to moisture.

There are known industrial solutions to the problem of the inadequate bond substrate. For instance, prior to bonding, glasses are coated with adhesion promoters which hydrophobize the surface and thereby eliminate the aforementioned layer of water. The hydrophobization is carried out using organosilanes. The most frequently employed in this context are those of the $(RO)_3Si-(CH_2)_n-X$ with $R=CH_3$ or $C_2H_5$,
$n=1$ to 12, and
a functional group X.

Following the application of the silane to the hydrophilic surface, a covalent bond is formed between surface and silane. If the surface is completely silanized, the film of water described above is removed and also cannot be formed again, and so the water is no longer able to run behind the bond.

There are silanes which react with adhesive and surface, and silanes which only hydrophobize the surface, in order to facilitate subsequent bonding and to strengthen the adhesive assembly. The use of such a silane is described in, for example, WO 2005/040296 A1, in which a silane is applied to a PSA prior to bonding. After bonding it is necessary to wait for at least 24 hours until the ultimate bond strength is reached. Furthermore, these silanes may be subdivided into reactive and moderately reactive silanes. Reactive silanes lead within a few minutes to effective hydrophobization of a surface, an effect which with moderately reactive silanes is achieved only after hours. The advantage of moderately reactive silanes, however, is their long shelf life of more than six months in solution. The group of the reactive silanes includes, for example, γ-aminopropyltriethoxysilane. 3-Glycidyloxypropyltrimethoxysilane, in contrast, is classed as moderately reactive.

WO 2005/040296 A1, then, shows the application of a solution of 3-glycidyloxypropyltrimethoxysilane for improving the bonding of acrylate adhesives to glass surfaces. In that application the contact between adhesive and surface is produced before the solvent has evaporated, in order to achieve covalent attachment of the silane both to the glass surface and to the adhesive in this way. After contact has been produced, it is necessary to wait 72 hours before the bond can be subjected to any loading.

The approach set out in WO 2005/040296 A1 is acceptable if it is possible to observe the waiting time of 72 hours. In many cases, however, this waiting time leads to delay in the production process. If, furthermore, the pretreatment of the surface is to be undertaken by the end user, in the case of domestic applications a shortening of the waiting time is an absolute necessity. The use of a reactive silane such as, for example, γ-aminopropyltriethoxysilane, which is described in DE 198 13 081 A1, does not provide a solution to the problem either, though, since in that case the shelf life is too short. Consumer products, for example, are frequently in the stockroom, or at the customer's premises, for quite some time before being used. Storage times of two years between production and use are not uncommon.

A first improvement to the shelf life was disclosed with a solution intended more particularly for pretreating a hydrophilic surface for the purpose of hydrophobizing, as disclosed in DE 10 2007 030 196 A1. The solution comprises a silane of the formula

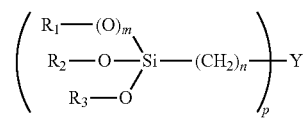

where
R1, R2, and R3 independently of one another are selected from the group of methyl, ethyl, 2-methoxyethyl and isopropyl
m=0 or 1
n=0 to 12
p=1 or 2 and if p=1
Y=a functional group selected from the group of alkyl, vinyl, phenyl, cyclobutyl, cyclopentyl, cyclohexyl, glycidyl, glycidyloxy, isocyanato, ureido, —CF3, —(CF2)qCF3 with q=1 to 12, cyanide, halide, (meth)acryloyl, (meth)acryloyloxy, —NH—CH2-CH2-NR4R5, —NR4R5 (where R4 and R5 independently of one another are selected from the group of H, alkyl, phenyl, benzyl, cyclopentyl and cycloalkyl)
or
if p=2
Y=O, S or NH,
and also comprising a component whose effect is that the pH range of the one hydrophilic surface deviates by at least two units from the neutral range.

DE 10 2007 030 196 A1 teaches the possibility of the solution including a small fraction of water (up to 5 percent by weight) without deleterious consequences for the shelf life.

According to DE 10 2007 030 196 A1, significantly higher proportions of water shorten the storage life considerably.

DE 10 2009 007 930 A1 proposes a further improvement for increasing the storage life of a highly reactive silane— that is, a silane which reacts very rapidly—through the use of a second silane which enhances the aging stability. With regard to the solvent it is taught to be an advantage if it contains at least 30 percent by weight of carboxylic esters.

With the improvements of the two specifications DE 10 2007 030 196 A1 and DE 10 2009 007 930 A1, it is indeed possible to achieve results which are largely practicable; however, the storage life of the primer solutions is still not entirely satisfactory. Thus, for example, it has been found that after a storage time of 5 months at 40° C., the solutions sometimes no longer function as they did originally. After that time a white precipitate is formed which, if applied to a tile, has a greasy effect and no longer has any adhesion-promoting effect.

It is an object of the invention to increase the storage life of a highly reactive—that is, very quickly reacting—primer solution for pretreating damp tiles and other hydrophilic surfaces, so that the product can be used for longer. The ultimate objective is to improve further the adhesion of "tesa Powerstrip"® and also other adhesive products to damp substrates through pretreatment with this primer solution, the improvement relating to the quickness with which adhesion is developed and to the holding power even after long storage time of the primer solution and also after storage thereof at relatively high temperatures.

The reactivity of the primer solution here ought to be so high that after no later than 10 minutes following application of the primer, bonding can take place and this bond can be loaded, as far as possible durably, after an extremely short time in a tip-shear bonding test on tiles using "tesa Powerstrip"® with a tip-shear load of 1 kg with a lever arm of 50 mm under heat-and-humidity conditions (35° C., 85% relative humidity).

This object is achieved by means of a solution as specified and described herein. Also described are advantageous developments of the subject matter of the invention. The invention further relates to uses of the solution of the invention and also to a set comprising the solution of the invention and an adhesive sheet.

The invention accordingly provides a solution particularly for pretreating a hydrophilic surface for the purpose of hydrophobizing, comprising I. at least one first silane of the formula

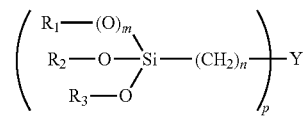

where
R1, R2, and R3 independently of one another are selected from the group of methyl, ethyl, 2-methoxyethyl, propyl, isopropyl, butyl, and benzyl
m=0 or 1
n=3 to 12
p=1 or 2
and if p=1
Y=a functional group selected from the group of (meth)acryloyl, (meth)acryloyloxy, mercapto, ureido, —NH—CH2-CH2-NR4R5, —NR4R5 (where R4 and R5 independently of one another are selected from the group of H, alkyl, phenyl, benzyl, and cycloalkyl),
or
if p=2
Y=NH,
and
II. at least one second silane of the formula

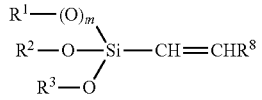

where
R1, R2, and R3 independently of one another are selected from the group of methyl, ethyl, 2-methoxyethyl, propyl, isopropyl, butyl, and benzyl
m=0 or 1
R8=H, alkyl, phenyl, benzyl or cycloalkyl,
and
III. at least one alcohol,
and
IV. water.

According to a first advantageous embodiment, the solution of the invention consists of the four components stated.

With further preference the solution has the following composition:
Silane I: 0.01 to 3.0 weight percent
Silane II: 0.05 to 5.0 weight percent
Water: 5.0 to 30.0 weight percent
Alcohol: 72 to 94.94 weight percent.

According to one advantageous embodiment of the invention, the first silane is an amino-functionalized silane, preferably 3-aminopropyltrimethoxysilane (CAS No.: 13822-56-5) or 3-aminopropyltriethoxysilane (CAS No.: 919-30-2).

The second silane is preferably vinyltrimethoxysilane (CAS No.: 2768-02-7) or vinyltriethoxysilane (CAS No.: 78-08-0).

With further preference the silanes are present in the solution in total in a concentration of 0.01 to 8.0 percent by weight, preferably 0.05 to 5.0 percent by weight, more preferably 0.1 to 3.0 percent by weight, very preferably 0.1 to 1.0 percent by weight.

The second silane is preferably present in a higher weight concentration than the first silane, preferably in a 1.20- to 10.0-fold weight concentration, more preferably in a 2.0- to 6.0-fold weight concentration.

For these preferred embodiments of the invention, the compositions of the solutions are preferably as follows:

| Ratio silane II/ silane I | Silane I (wt %) | Silane II (wt %) | Water (wt %) | Alcohol (wt %) |
|---|---|---|---|---|
| 1.2 | 0.01 to 4.17 | 0.012 to 5.0 | 5 to 30 | 60.83 to 94.978 |
| 2 | 0.01 to 2.5 | 0.02 to 5.0 | 5 to 30 | 62.5 to 94.97 |
| 3 | 0.01 to 1.67 | 0.03 to 5.0 | 5 to 30 | 63.33 to 94.96 |
| 6 | 0.01 to 0.83 | 0.06 to 5.0 | 5 to 30 | 64.17 to 94.93 |
| 10 | 0.01 to 0.5 | 0.10 to 5.0 | 5 to 30 | 64.5 to 94.89 |

In one advantageous embodiment, the at least one alcohol is isopropanol or ethanol, preferably isopropanol.

The water advantageously is distilled or fully demineralized water.

The concentration of the water in the solution is advantageously between greater than 5 weight percent and less than 30 weight percent, preferably between greater than 6 weight percent and less than 20 weight percent, more preferably between greater than 7 weight percent and less than 10 weight percent.

It is advantageous, moreover, if the solution contains no further silanes differing from the formulae above. It is particularly advantageous if the solution contains no silane of the formula $Si(OR^9)_4$ with $R^9$=methyl, ethyl, n-propyl, isopropyl, butyl, isobutyl, benzyl, phenyl.

It is advantageous, moreover, if in the use of the solution of the invention there are no particular protective measures such as gloves required, which is why an alcohol/water mixture is used, as a relatively harmless solvent.

Examples of silanes of group I (first silane) are N-2-aminoethyl-3-aminopropyltrimethoxysilane (CAS No.: 1760-24-3, Dynasylan DAMO®, Evonik), bis[3-triethoxysilyl)propyl]amine (CAS No.: 13497-18-2, Dynasylan 1122®, Evonik), N-(n-butyl)-3-aminopropyltrimethoxysilane (CAS No.: 31024-56-3, Dynasylan 1189®, Evonik), 3-aminopropyltriethoxysilane (CAS No.: 919-30-2, Dynasylan AMEO®, Evonik, Geniosil GF 93®, Wacker), 3-aminopropyltrimethoxysilane (CAS No.: 13822-56-5, Sigma-Aldrich), and 3-methacryloyloxypropyltrimethoxysilane (CAS No.: 2530-85-0, Dynasylan MEMO®, Evonik). Silanes of group II (second silane) are, for example, vinyltriethoxysilane (CAS No.: 78-08-0, Dynasylan VTEO®, Evonik), vinyltrimethoxysilane (CAS No.: 2768-02-7, Dynasylan VTMO®, Evonik, Geniosil XL 100 Wacker) or vinyltris(2-methoxyethoxy)silane (CAS No.: 1067-53-4, Dynasylan VTMOEO®, Evonik).

The functioning of the solution of the invention can be elucidated using the example of the reaction of the silanes with a glass surface. The reaction of the silanes with the glass surface takes place in one step. The silanes are already in hydrolyzed form, meaning that the alcoholic groups RO originally present in the silanes have already been eliminated by the reaction with the water, and replaced by hydroxyl groups. The resultant Si—OH (silanol) groups react on the one hand with themselves and on the other with the OH groups of the glass surface, thereby forming a covalent bond. When the glass surface is completely silanized, the film of water described above is removed and also can no longer be formed, meaning that the water is no longer able to run behind the bond.

Surprisingly simply and, for the skilled person, entirely unexpectedly, the stated object, that of increasing the aging stability of a highly reactive that is, very quickly reacting primer solution for the pretreatment of damp tiles and other hydrophilic surfaces, is achieved by means of an aqueous-alcoholic solution of two silanes, as specified and described herein. Because the silanes are already in hydrolyzed form, the reactivity is in fact increased relative to that of an unhydrolyzed solution of silanes, with an improvement in the aging stability at the same time.

The presentation form of the solution of the invention is critically important particularly for application in the domestic sector by the end user. Preference is given here to dispensing in bottles, tubes or cans, as a pump spray or an aerosol, for example, or to dispensing in sealed-edge pouches containing a nonwoven web, a woven fabric or a sponge. A sealed-edge pouch of this kind consists of a solvent-impermeable and water-impermeable foil, such as a PE/Al/PET composite, for example. This foil can be welded under the action of heat. Within the resultant pouch there is a cloth, ideally a nonwoven web, which is impregnated with the adhesion promoter solution, consisting at least of the two silanes and solvent. For application, the end user can tear open the pouch, take out the impregnated cloth, and use it to pretreat the ceramic substrate, the tile or the glass to which bonding is to take place.

Another preferred form of presentation entails dispensing into containers comprising a reservoir and an applicator. In that case the silane solution is applied by contacting the surface with the applicator.

Especially preferred are packs where the user is quite simply unable to come into contact with the solutions, even during use.

For example, a nonwoven web or a sponge may be integrated into a pack in such a way that they are located on the free surface of the pack. Additionally located in the pack is the solution, which is separated from the nonwoven web or sponge by a severable membrane, or which is enclosed by an envelope and in that way is separate from the nonwoven web or the sponge.

After the membrane has been severed or an envelope has been destroyed by pressure exerted by the user on the pack, the nonwoven web becomes wetted, by the solution being supplied through an appropriately formed channel to the nonwoven web or to the sponge.

The solution penetrates the exposed web or the sponge and can be contacted therewith by the hydrophilic surface, without the user touching the nonwoven web or the sponge.

Optimally, the reaction on the surface then occurs within a few minutes, and so subsequently the bonding operation and also the loading of the bond can take place.

Adhesive tapes which can be used preferably in combination with the invention are highly elastic adhesive sheets for repartable bonds which can be reparted by pulling in the direction of the bond plane. These adhesive sheets are available commercially under the names "tesa Powerstrips"® and "tesa Posterstrips"® and "tesa Powerstrips System-Haken"®, a so-called system hook with baseplate and attachable decorative hook, from tesa SE. Furthermore, 3M, under the "Command Adhesive" name, offers similar adhesive sheets, also partable by pulling, which consist of an intermediate foam carrier bearing applied adhesives on both sides.

Elastically or plastically highly extensible pressure-sensitive adhesive strips which can be redetached without residue or destruction by extensive stretching in the bond plane are known, furthermore, for example from U.S. Pat. No. 4,024,312 A, DE 33 31 016 C2, WO 92/11332 A1, WO 92/11333 A1, DE 42 22 849 A1, WO 95/06691 A1, DE 195 31 696 A1, DE 196 26 870 A1, DE 196 49 727 A1, DE 196

49 728 A1, DE 196 49 729 A1, DE 197 08 364 A1, DE 197 20 145 A1, DE 198 20 854 A1, WO 99/37729 A1 and DE 100 03 318 A1.

The examples below are intended to illustrate the invention, without any intention to limit it.

EXAMPLES

The test methods below were used to provide brief characterization of the primer solutions produced in accordance with the invention.

The measurements are carried out, unless otherwise indicated, under test conditions of 23±1° C. and 50±5% relative atmospheric humidity.

Test Methods

To investigate the solutions, they were each briefly coated onto a ceramic tile with smooth glazing, using a nonwoven web soaked with the respective solution (designation of the web used: EVO 80, composition: polyester/polyamide 6, 70/30, from Freudenberg). After a waiting time of 10 minutes, in which the solvent evaporated, two different adhesive tapes were adhered to the tiles pretreated in this way.

First, a double-sided acrylate tab, Tesa® 4952 (a double-sided adhesive tape with a foam carrier and an aging-resistant acrylate adhesive having a thickness of 1.2 mm and a peel adhesion on steel of 14 N/25 mm) was used, and secondly Powerstrips® Large from tesa (double-sidedly adhering, carrier-less diecuts, in individual sealed enclosures, with an adhesive based on synthetic rubber with a thickness of 0.65 mm and a peel adhesion on steel of 74.0 N/25 mm), as can be found in the examples in DE 100 55 942 A1.

The latter strips are also comprehensively described in DE 33 31 016 C2, DE 42 22 849 A1, DE 42 33 872 A1, DE 44 31 914 A1, DE 195 37 323 A1, DE 197 08 364 A1, DE 197 29 706 and DE 100 33 399 A1.

The bond areas in both cases were 3.8 cm×2.0 cm. Three individual bonds were made in each case.

A cleaned steel baseplate, provided centrally in the middle with a screw hole, was adhered to the bonding agents using a pressure of 100 N lasting for 10 seconds. A metal rod 3 mm in width was screwed into the screw hole, and therefore projected vertically from the steel baseplate. This rod had notches, allowing weights to be mounted at a defined distance from the steel plate. The tiles were brought immediately thereafter into a chamber held under constant conditions, with a temperature of 35° C. and a relative atmospheric humidity of 85%, where they were affixed perpendicularly, and a weight of 200 g in the case of the acrylate tab and 1 kg in the case of the Powerstrip was suspended, at a distance of 50 mm, from the rod, which was hence now projecting horizontally.

The weight was suspended:
a) immediately after the perpendicular affixing of the tile (not more than 3 minutes after the bonding of the steel baseplate)
b) 15 minutes after the perpendicular affixing of the tile
c) 30 minutes after the perpendicular affixing of the tile.

After a subsequent waiting time of 10 minutes, water (2 ml) was trickled at the top onto the edge of the bonded joint. This wetting was repeated every 24 hours. A measurement was made of the time in hours before the rod fell from the wall. For the purpose of comparison, rods without adhesion promoter were suspended.

These experiments were carried out with fresh specimens and stored specimens. The specimens were in one case introduced into well-sealed 500 ml screw-top glasses (in each case about 350 ml of primer solution per glass), and in another instance were welded into sealed-edge pouches (sachets) having a three-ply polyester/aluminum/polyethylene construction. Likewise welded into each of the sachets was a folded-up nonwoven web (EVO 80) with an area of 6 cm×12 cm. Each sachet held about 0.85 ml of primer solution.

The stored specimens were also assessed visually. This was done to determine whether the solutions were clear or whether there was clouding or a white precipitate.

The investigations and assessments were made after the following storage times:

Fresh (after not more than three days of storage at room temperature (23° C.))
After 12 months at room temperature (23° C.)
After 12 months at 40° C.
After 12 months at 55° C.

The results are apparent from the tables subsequent to the individual examples.

Production of the Primer Solutions

The primer solutions of the invention and also the comparative specimens were produced using the following silanes:

| Silane | Trade name | CAS No. | Manufacturer or supplier |
|---|---|---|---|
| 3-Aminopropyltrimethoxysilane | | 13822-56-5 | Sigma-Aldrich |
| 3-Aminopropyltriethoxysilane | Dynasylan AMEO ® | 919-30-2 | Evonik |
| N-2-Aminoethyl-3-aminopropyltrimethoxysilane | Dynasylan DAMO ® | 1760-24-3 | Evonik |
| Bis[3-triethoxysilyl)propyl]amine | Dynasylan 1122 ® | 13497-18-2 | Evonik |
| 3-Methacryloyloxypropyltrimethoxysilane | Dynasylan MEMO ® | 2530-85-0 | Evonik |
| Vinyltrimethoxysilane | Dynasylan VTMO ® | 2768-02-7 | Evonik |
| Vinyltriethoxysilane | Dynasylan VTEO ® | 78-08-0 | Evonik |
| Tetraethoxysilane | Dynasylan A ® | 78-10-4 | Evonik |

Additionally, the following solvents were used:

| Solvent | CAS No. | Manufacturer or supplier |
|---|---|---|
| Ethanol | 64-17-5 | Sigma-Aldrich |
| Isopropanol | 67-63-0 | Sigma-Aldrich |
| n-Butanol | 71-36-3 | Sigma-Aldrich |
| Butyl acetate | 123-86-4 | Sigma-Aldrich |
| Water, fully demineralized | 7732-18-5 | CSC Jäklechemie |

The silanes/solvents indicated in the examples were mixed with a laboratory stirring mechanism from IKA® using a propeller stirrer, as follows: where two or more solvents were used, they were first mixed homogeneously for 15 minutes. Then the silanes were added. Where two or more silanes were used, this addition took place in successive individual steps. In other words, first of all the first of the silanes listed in the examples below was added and mixed in. Only after the first silane had been mixed in was the second silane added and likewise mixed in, and so on. The process of mixing in took place for each silane by 15 minutes of stirring at moderate stirring velocity. For each of the solutions, 350 ml were produced and were dispensed into 500 ml screw-top glasses. 0.85 ml was placed into a respective sachet, and welded into the sachet together with the nonwoven web.

Inventive Example 1

Composition of the Primer Solution:

| Raw material | Weight percent |
|---|---|
| Isopropanol | 90.0 |
| Water, fully demineralized | 9.4 |
| Dynasylan AMEO ® | 0.3 |
| Dynasylan VTMO ® | 0.3 |

Results:

| Storage time | Visual assessment of solution | Time before the weight was suspended | Adhesive tape | Holding time (hours) |
|---|---|---|---|---|
| Fresh | Clear | Immediate | Acrylate tab | <1 |
| | | | Powerstrip | <1 |
| | | 15 minutes | Acrylate tab | 20 |
| | | | Powerstrip | 16 |
| | | 30 minutes | Acrylate tab | 400 |
| | | | Powerstrip | 350 |
| 12 months 23° C. | Clear | Immediate | Acrylate tab | <1 |
| | | | Powerstrip | <1 |
| | | 15 minutes | Acrylate tab | 18 |
| | | | Powerstrip | 14 |
| | | 30 minutes | Acrylate tab | 450 |
| | | | Powerstrip | 400 |
| 12 months 40° C. | Clear | Immediate | Acrylate tab | <1 |
| | | | Powerstrip | <1 |
| | | 15 minutes | Acrylate tab | 24 |
| | | | Powerstrip | 20 |
| | | 30 minutes | Acrylate tab | 400 |
| | | | Powerstrip | 380 |
| 12 months 55° C. | Clear | Immediate | Acrylate tab | n.d. |
| | | | Powerstrip | <1 |
| | | 15 minutes | Acrylate tab | n.d. |
| | | | Powerstrip | 20 |
| | | 30 minutes | Acrylate tab | n.d. |
| | | | Powerstrip | 320 | n.d. = not determined

Inventive Example 2

Composition of the Primer Solution:

| Raw material | Weight percent |
|---|---|
| Isopropanol | 90.0 |
| Water, fully demineralized | 9.2 |
| Dynasylan AMEO ® | 0.6 |
| Dynasylan VTMO ® | 0.2 |

Results:

| Storage time | Visual assessment of solution | Time before the weight was suspended | Adhesive tape | Holding time (hours) |
|---|---|---|---|---|
| Fresh | Clear | Immediate | Acrylate tab | <1 |
| | | | Powerstrip | <1 |

-continued

| Storage time | Visual assessment of solution | Time before the weight was suspended | Adhesive tape | Holding time (hours) |
|---|---|---|---|---|
| | | 15 minutes | Acrylate tab | 10 |
| | | | Powerstrip | 13 |
| | | 30 minutes | Acrylate tab | 200 |
| | | | Powerstrip | 300 |
| 12 months 23° C. | Clear | Immediate | Acrylate tab | <1 |
| | | | Powerstrip | <1 |
| | | 15 minutes | Acrylate tab | 14 |
| | | | Powerstrip | 10 |
| | | 30 minutes | Acrylate tab | 200 |
| | | | Powerstrip | 350 |
| 12 months 40° C. | Clear | Immediate | Acrylate tab | <1 |
| | | | Powerstrip | <1 |
| | | 15 minutes | Acrylate tab | 20 |
| | | | Powerstrip | 22 |
| | | 30 minutes | Acrylate tab | 300 |
| | | | Powerstrip | 320 |
| 12 months 55° C. | Clear | Immediate | Acrylate tab | n.d. |
| | | | Powerstrip | <1 |
| | | 15 minutes | Acrylate tab | n.d. |
| | | | Powerstrip | 15 |
| | | 30 minutes | Acrylate tab | n.d. |
| | | | Powerstrip | 200 | n.d. = not determined

Inventive Example 3

Composition of the Primer Solution:

| Raw material | Weight percent |
|---|---|
| Isopropanol | 90.0 |
| Water, fully demineralized | 9.2 |
| Dynasylan AMEO ® | 0.2 |
| Dynasylan VTMO ® | 0.55 |
| Dynasylan A ® | 0.05 |

Results:

| Storage time | Visual assessment of solution | Time before the weight was suspended | Adhesive tape | Holding time (hours) |
|---|---|---|---|---|
| Fresh | Clear | Immediate | Acrylate tab | 10 |
| | | | Powerstrip | 15 |
| | | 15 minutes | Acrylate tab | 100 |
| | | | Powerstrip | 150 |
| | | 30 minutes | Acrylate tab | 400 |
| | | | Powerstrip | 450 |
| 12 months 23° C. | Clear | Immediate | Acrylate tab | 20 |
| | | | Powerstrip | 30 |
| | | 15 minutes | Acrylate tab | 18 |
| | | | Powerstrip | 14 |
| | | 30 minutes | Acrylate tab | 450 |
| | | | Powerstrip | 400 |
| 12 months 40° C. | Clear | Immediate | Acrylate tab | 10 |
| | | | Powerstrip | 12 |
| | | 15 minutes | Acrylate tab | 24 |
| | | | Powerstrip | 20 |
| | | 30 minutes | Acrylate tab | 400 |
| | | | Powerstrip | 380 |
| 12 months 55° C. | Cloudy | Immediate | Acrylate tab | <1 |
| | | | Powerstrip | <1 |
| | | 15 minutes | Acrylate tab | 10 |
| | | | Powerstrip | 10 |
| | | 30 minutes | Acrylate tab | 80 |
| | | | Powerstrip | 100 |

Inventive Example 4

Composition of the Primer Solution:

| Raw material | Weight percent |
|---|---|
| Isopropanol | 84.6 |
| Water, fully demineralized | 9.4 |
| Dynasylan AMEO ® | 2.0 |
| Dynasylan VTMO ® | 4.0 |

Results:

| Storage time | Visual assessment of solution | Time before the weight was suspended | Adhesive tape | Holding time (hours) |
|---|---|---|---|---|
| Fresh | Clear | Immediate | Acrylate tab | 1 |
| | | | Powerstrip | 1 |
| | | 15 minutes | Acrylate tab | 70 |
| | | | Powerstrip | 90 |
| | | 30 minutes | Acrylate tab | 300 |
| | | | Powerstrip | 410 |
| 12 months 23° C. | Clear | Immediate | Acrylate tab | <1 |
| | | | Powerstrip | <1 |
| | | 15 minutes | Acrylate tab | 60 |
| | | | Powerstrip | 80 |
| | | 30 minutes | Acrylate tab | 300 |
| | | | Powerstrip | 320 |
| 12 months 40° C. | Clear | Immediate | Acrylate tab | <1 |
| | | | Powerstrip | <1 |
| | | 15 minutes | Acrylate tab | 30 |
| | | | Powerstrip | 20 |
| | | 30 minutes | Acrylate tab | 200 |
| | | | Powerstrip | 300 |
| 12 months 55° C. | Cloudy | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | 30 |
| | | | Powerstrip | 150 |

Inventive Example 5

Composition of the Primer Solution:

| Raw material | Weight percent |
|---|---|
| Ethanol | 90.0 |
| Water, fully demineralized | 9.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | 250 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |

Inventive Example 6

Composition of the Primer Solution:

| Raw material | Weight percent |
|---|---|
| n-Butanol | 90.0 |
| Water, fully demineralized | 9.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | 200 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | 220 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | 100 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | 100 |
| | | | Powerstrip | 150 |
| | | 15 minutes | Acrylate tab | >500 |
| | | | Powerstrip | >500 |
| | | 30 minutes | Acrylate tab | >500 |
| | | | Powerstrip | >500 |

Inventive Example 7

Composition of the Primer Solution:

| Raw material | Weight percent |
|---|---|
| Isopropanol | 90.0 |
| Water, fully demineralized | 9.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

-continued

| Storage time | Visual assessment of solution | Time before the weight was suspended | Adhesive tape | Holding time (hours) |
|---|---|---|---|---|
| 12 months 40° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

Inventive Example 8

Composition of the Primer Solution:

| Raw material | Weight percent |
|---|---|
| Isopropanol | 90.0 |
| Water, fully demineralized | 9.2 |
| 3-Aminopropyltrimethoxysilane | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

Inventive Example 9

Composition of the Primer Solution:

| Raw material | Weight percent |
|---|---|
| Isopropanol | 69.2 |
| Water, fully demineralized | 30.0 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | 50 |
| | | | Powerstrip | 80 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Cloudy | Immediate | Acrylate tab | <1 |
| | | | Powerstrip | <1 |
| | | 15 minutes | Acrylate tab | 100 |
| | | | Powerstrip | 150 |
| | | 30 minutes | Acrylate tab | 200 |
| | | | Powerstrip | >500 |

Inventive Example 10

Composition of the Primer Solution:

| Raw material | Weight percent |
|---|---|
| Isopropanol | 90.0 |
| Water, fully demineralized | 9.2 |
| Dynasylan DAMO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | 400 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

17 -continued

| Storage time | Visual assessment of solution | Time before the weight was suspended | Adhesive tape | Holding time (hours) |
|---|---|---|---|---|
| 12 months 40° C. | Clear | Immediate | Acrylate tab | 300 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | 200 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |

Inventive Example 11

Composition of the Primer Solution:

| Raw material | Weight percent |
|---|---|
| Isopropanol | 90.0 |
| Water, fully demineralized | 9.2 |
| Dynasylan 1122 ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | 400 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | 300 |
| | | | Powerstrip | 400 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | 300 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |

Inventive Example 12

Composition of the Primer Solution:

| Raw material | Weight percent |
|---|---|
| Isopropanol | 90.0 |
| Water, fully demineralized | 9.2 |
| Dynasylan MEMO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | 400 |
| | | | Powerstrip | 300 |
| | | 15 minutes | Acrylate tab | >500 |
| | | | Powerstrip | >500 |
| | | 30 minutes | Acrylate tab | >500 |
| | | | Powerstrip | >500 |
| 12 months 23° C. | Clear | Immediate | Acrylate tab | 300 |
| | | | Powerstrip | 400 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | 100 |
| | | | Powerstrip | 100 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | 100 |
| | | | Powerstrip | 50 |
| | | 15 minutes | Acrylate tab | 300 |
| | | | Powerstrip | 300 |
| | | 30 minutes | Acrylate tab | >500 |
| | | | Powerstrip | >500 |

Inventive Example 13

Composition of the Primer Solution:

| Raw material | Weight percent |
|---|---|
| Isopropanol | 90.0 |
| Water, fully demineralized | 9.2 |
| Dynasylan AMEO ® | 0.2 |
| Dynasylan VTEO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

-continued

| Storage time | Visual assessment of solution | Time before the weight was suspended | Adhesive tape | Holding time (hours) |
|---|---|---|---|---|
| 12 months 23° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 40° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |
| 12 months 55° C. | Clear | Immediate | Acrylate tab | >500 |
| | | | Powerstrip | >500 |
| | | 15 minutes | Acrylate tab | >500 |
| | | | Powerstrip | >500 |
| | | 30 minutes | Acrylate tab | >500 |
| | | | Powerstrip | >500 |

Comparative Example 1

Composition of the Comparative Specimen:

| Raw material | Weight percent |
|---|---|
| Isopropanol | 90.0 |
| Water, fully demineralized | 9.2 |
| Dynasylan AMEO ® | 0.8 |

Results:

| Storage time | Visual assessment of solution | Time before the weight was suspended | Adhesive tape | Holding time (hours) |
|---|---|---|---|---|
| Fresh | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | 20 |
| | | | Powerstrip | 10 |
| 12 months 23° C. | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | 10 |
| | | | Powerstrip | 5 |
| 12 months 40° C. | Clear | Immediate | Acrylate tab | <1 |
| | | | Powerstrip | <1 |
| | | 15 minutes | Acrylate tab | <1 |
| | | | Powerstrip | 3 |
| | | 30 minutes | Acrylate tab | 2 |
| | | | Powerstrip | <1 |
| 12 months 55° C. | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |

Comparative Example 2

Composition of the Comparative Specimen:

| Raw material | Weight percent |
|---|---|
| Isopropanol | 90.0 |
| Water, fully demineralized | 9.2 |
| Dynasylan VTMO ® | 0.8 |

Results:

| Storage time | Visual assessment of solution | Time before the weight was suspended | Adhesive tape | Holding time (hours) |
|---|---|---|---|---|
| Fresh | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | 5 |
| | | | Powerstrip | 5 |
| 12 months 23° C. | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | 5 |
| | | | Powerstrip | 5 |
| 12 months 40° C. | Clear | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 55° C. | Clear | Immediate | Acrylate tab | <1 |
| | | | Powerstrip | <1 |
| | | 15 minutes | Acrylate tab | 2 |
| | | | Powerstrip | 2 |
| | | 30 minutes | Acrylate tab | <1 |
| | | | Powerstrip | <1 |

Comparative Example 3

Composition of the Comparative Specimen:

| Raw material | Weight percent |
|---|---|
| Butyl acetate | 90.0 |
| Water, fully demineralized | 9.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |

-continued

| Storage time | Visual assessment of solution | Time before the weight was suspended | Adhesive tape | Holding time (hours) |
|---|---|---|---|---|
| 12 months 23° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 40° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 55° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |

Comparative Example 4

Composition of the Comparative Specimen:

| Raw material | Weight percent |
|---|---|
| Isopropanol | 99.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Clear | Immediate | Acrylate tab | <1 |
| | | | Powerstrip | <1 |
| | | 15 minutes | Acrylate tab | 5 |
| | | | Powerstrip | 5 |
| | | 30 minutes | Acrylate tab | 10 |
| | | | Powerstrip | 10 |
| 12 months 23° C. | Clear | Immediate | Acrylate tab | <1 |
| | | | Powerstrip | <1 |
| | | 15 minutes | Acrylate tab | 5 |
| | | | Powerstrip | 5 |
| | | 30 minutes | Acrylate tab | 8 |
| | | | Powerstrip | 10 |
| 12 months 40° C. | Cloudy | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 55° C. | Cloudy | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |

Comparative Example 5

Composition of the Comparative Specimen:

| Solvent, silane | Weight percent |
|---|---|
| Water, fully demineralized | 99.2 |
| Dynasylan AMEO ® | 0.2 |
| Dynasylan VTMO ® | 0.6 |

Results:

| Storage time | Visual assessment of solution | Time before the weight was suspended | Adhesive tape | Holding time (hours) |
|---|---|---|---|---|
| Fresh | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 23° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 40° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |
| 12 months 55° C. | Precipitate | Immediate | Acrylate tab | <1 |
| | | | Powerstrip | <1 |
| | | 15 minutes | Acrylate tab | <1 |
| | | | Powerstrip | <1 |
| | | 30 minutes | Acrylate tab | <1 |
| | | | Powerstrip | <1 |

All of the experiments were carried out both with the solutions stored in the screw-top glasses and with the solutions from the sachets. The results were identical in each case. Comparative experiments without adhesion promoters gave holding times of not more than 1 hour in the case of the acrylate tab and less than 1 hour in the case of the Powerstrip.

The invention claimed is:
1. A solution comprising:
   a hydrolysate of a first silane selected from the group consisting of a hydrolysate of 3-aminopropyltrimethoxysilane and a hydrolysate of 3-aminopropyltriethoxysilane;
   a hydrolysate of a second silane selected from the group consisting of a hydrolysate of vinyltrimethoxysilane and a hydrolysate of vinyltriethoxysilane;
   isopropanol; and
   water,
   wherein:
      the solution comprises no hydrolysates of silanes in addition to the hydrolysate of the first silane and the hydrolysate of the second silane;
      the hydrolysate of the first silane and the hydrolysate of the second silane are present in a total concentration of 0.1 to 1 percent by weight of the solution;

the hydrolysate of the second silane is present at a 2.0- to 6.0-fold weight concentration compared to the hydrolysate of the first silane; and the water is present at greater than 5.0 percent but less than 30.0 percent by weight of the solution.

2. The solution as claimed in claim 1, wherein the isopropanol is present at 72 to 94.94 percent by weight of the solution.

3. The solution as claimed in claim 1, wherein the water is distilled or fully-demineralized water.

4. The solution as claimed in claim 1, wherein the solution has been dispensed into a pump spray or an aerosol.

5. The solution as claimed in claim 1, wherein the solution has been dispensed into a sealed-edge pouch comprising a nonwoven web, a woven fabric, or a sponge.

6. The solution as claimed in claim 1, wherein:
the solution has been dispensed into a container comprising a reservoir and an applicator; and
the solution is capable of being applied contactlessly.

7. The solution as claimed in claim 1, wherein the solution is located in a pack into which a nonwoven web, a woven fabric, or a sponge is integrated such that the nonwoven web, the woven fabric, or the sponge is located on a free surface of the pack, the solution being:
separated from the nonwoven web, the woven fabric, or the sponge by a severable membrane, or
surrounded by an envelope and thus separated from the nonwoven web, the woven fabric, or the sponge.

8. A method comprising applying the solution as claimed in claim 1 to a hydrophilic surface.

9. A method comprising:
applying the solution as claimed in claim 1 to a hydrophilic surface; and
bonding a sheet of an adhesive to the hydrophilic surface, wherein:
the hydrophilic surface can be repartitioned without damage;
the sheet of an adhesive comprises an adhesive based on polymers and/or copolymers of synthetic rubber and/or natural rubber;
the hydrophilic surface comprises a bond plane having a direction; and
the repartitioning without damage can be accomplished by pulling in the direction of the bond plane.

10. A kit comprising a solution as claimed in claim 1 and an adhesive sheet, wherein:
the adhesive sheet can be repartitioned without damage;
the adhesive is based on polymers and/or copolymers of synthetic rubber and/or natural rubber;
the adhesive sheet comprises a bond plane having a direction; and
the repartitioning without damage can be accomplished by pulling in the direction of the bond plane.

11. The solution as claimed in claim 1, consisting of the hydrolysate of the first silane, the hydrolysate of the second silane, the isopropanol, and the water.

12. The solution as claimed in claim 1, wherein the water is present at greater than 6 percent but less than 20 percent by weight of the solution.

13. The solution as claimed in claim 1, wherein the water is present at greater than 7 percent but less than 10 percent by weight of the solution.

14. The solution as claimed in claim 1, which exhibits the following property: after pretreating a damp surface by applying the solution to said damp surface, a repartable adhesive strip adheres to a damp surface as a result of the pretreating for a longer period of time than if the damp surface had not been subjected to said pretreating.

15. A solution consisting of:
a hydrolysate of a first silane selected from the group consisting of a hydrolysate of 3-aminopropyltrimethoxysilane and a hydrolysate of 3-aminopropyltriethoxysilane;
a hydrolysate of a second silane selected from the group consisting of a hydrolysate of vinyltrimethoxysilane and a hydrolysate of vinyltriethoxysilane;
isopropanol; and
water,
wherein:
the hydrolysate of the first silane and the hydrolysate of the second silane are present in a total concentration of 0.05 to 5 percent by weight of the solution and the hydrolysate of the second silane is present at a 3.0- to 6.0-fold weight concentration compared to the hydrolysate of the first silane.

* * * * *